Sept. 7, 1954  E. J. POIRIER  2,688,513
POWER OPERATED VEHICLE COVER
Filed Oct. 27, 1952  2 Sheets-Sheet 1
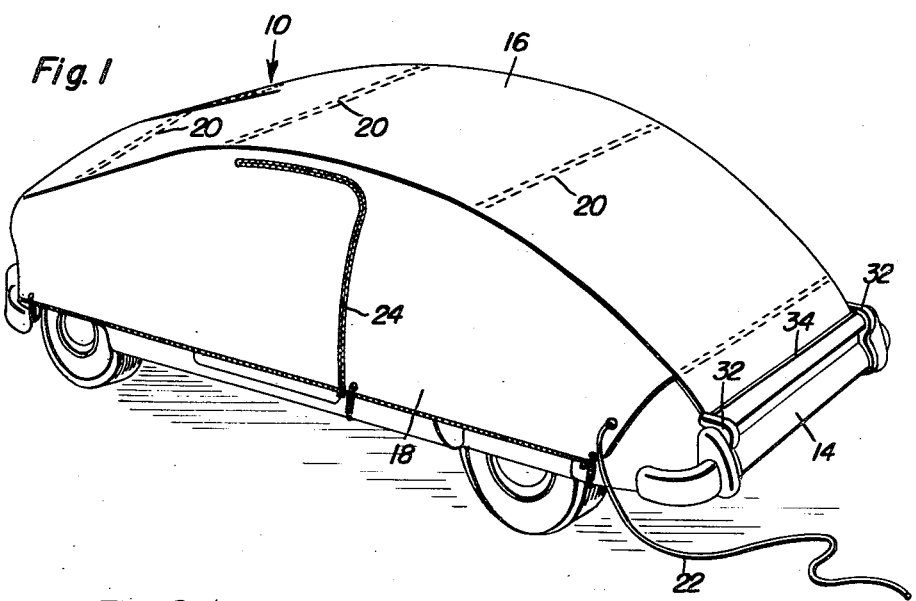
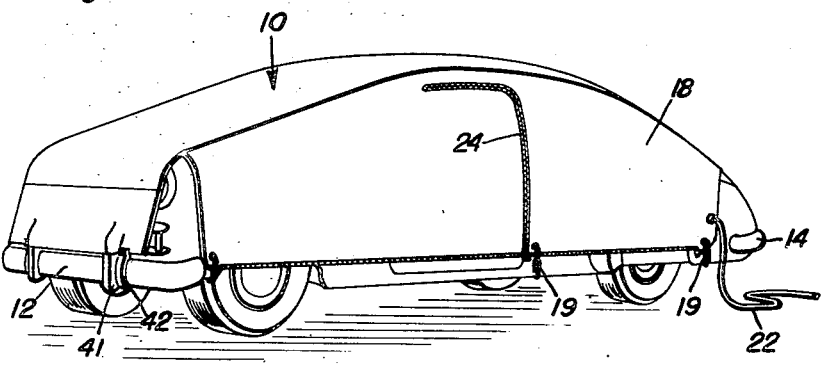
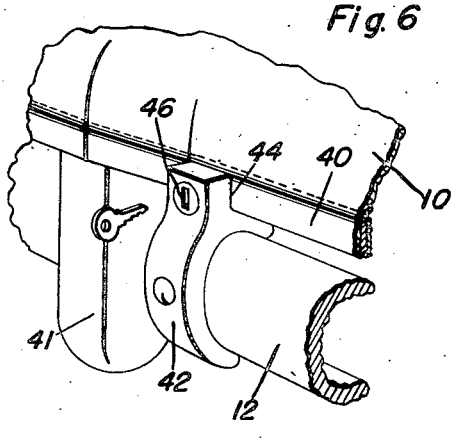
Ernest J. Poirier
INVENTOR.

Sept. 7, 1954 E. J. POIRIER 2,688,513
POWER OPERATED VEHICLE COVER
Filed Oct. 27, 1952 2 Sheets-Sheet 2

Ernest J. Poirier
INVENTOR.

BY *Clarence A. O'Brien*
*and Harvey B. Jacobson*
Attorneys

Patented Sept. 7, 1954

2,688,513

UNITED STATES PATENT OFFICE 2,688,513

POWER OPERATED VEHICLE COVER

Ernest J. Poirier, Santa Barbara, Calif.

Application October 27, 1952, Serial No. 316,990

7 Claims. (Cl. 296—98)

This invention comprises novel and useful improvements in a power operated vehicle cover, and more specifically pertains to a pliable sheet adapted to enclose and protect an automotive vehicle and which may be compactly stored in a manner to be instantly available for use as required.

The present invention relates to subject matter generally similar to that set forth in my copending application, Serial No. 230,453, filed June 8, 1951, now Patent 2,666,840, for Vehicle Cover, and constitutes improvements thereover.

The principal object of this invention is to provide a protective covering of pliable material for automotive vehicles which shall be adapted to be carried at all times by the vehicle and to be compactly stored thereon when not in use in a manner whereby the same may be instantly available when its services are required.

A further object of the invention is to provide a protective covering in conformance with the preceding object which shall not only completely enclose the top, front, rear and sides of a vehicle for efficiently and dependably protecting the same against the weather and the like, but also may be utilized for heating the vehicle while the same is so protected.

A still further important object of the invention is to provide a protective covering which will permit access to the interior of the vehicle in a readily accessible manner when the protective covering is secured in place upon the vehicle.

A still further important object of the invention is to provide a protective covering wherein power means are provided for retracting and storing the cover upon a reel when the same is not in use; and wherein the power operated means may be utilized to advance the covering from the reel to facilitate the application of the same about the vehicle.

A further and important specific object of the invention is to provide a power operated vehicle cover wherein the power operating means may be housed in and carried by a part of the supporting bracket structure whereby the cover and its storage reel are removably mounted upon the rear bumper of a vehicle.

An additional important object of the invention is to provide an improved power operated vehicle cover as set forth in the foregoing objects wherein the cover may be secured to the vehicle in an improved manner for protecting the same.

And a final important object of the invention to be specifically enumerated herein, resides in the provision of a power operated vehicle cover whereby the same may be selectively retracted into its storage device or advanced therefrom and wherein guide means are provided for facilitating the advancing of the protective covering from its storage facilities to facilitate the application of the cover to the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing a protective vehicle cover in accordance with this invention applied to a vehicle for protecting the same, the view being taken from the side and rear of the vehicle;

Figure 2 is a view similar to Figure 1, the view being taken from the front and side of the vehicle;

Figure 6 is a fragmentary perspective detail view showing the manner in which the front end of the cover is locked to the front bumper of a vehicle.

Figure 3:
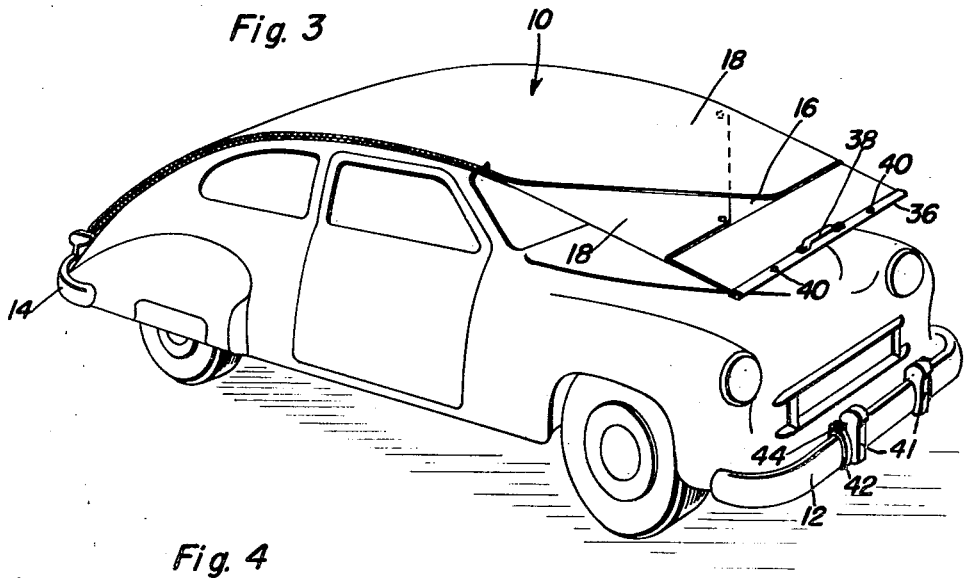
Figure 3 is a side elevational view showing the covering partially extended from its storage means and just prior to fastening of the cover to the front bumper of the vehicle.
Figure 4:
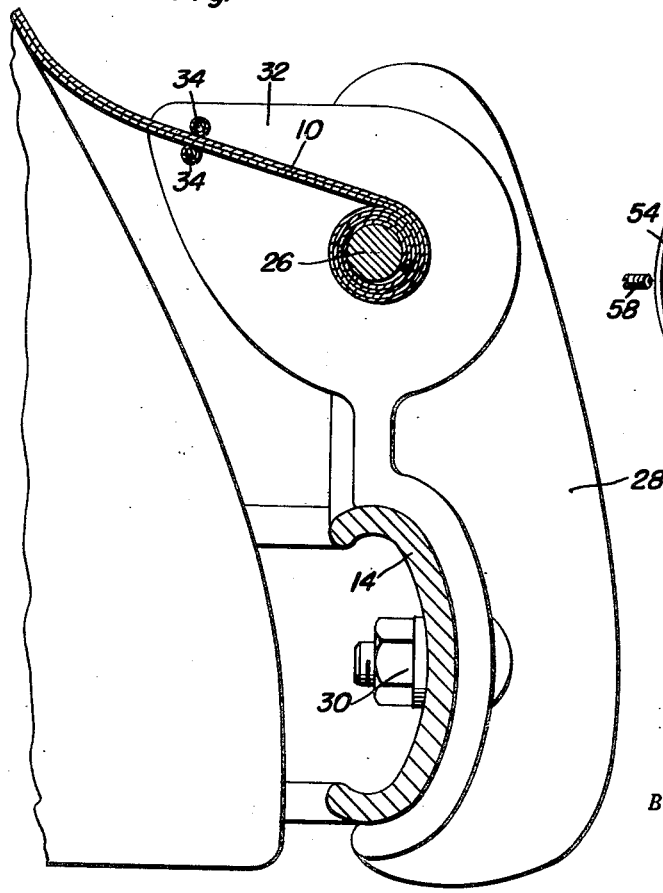
Figure 4 is an enlarged detail view showing in vertical section the mounting of the reel upon the rear bumper of a vehicle and the guide means for the cover as the same is advanced from the reel.

In the accompanying drawings there is disclosed an automotive vehicle which can be of any conventional type, the same having the flexible protective covering indicated generally by the numeral 10 applied thereto, the vehicle being further provided with a front bumper 12 and a rear bumper 14 in accordance with conventional practice.

In general, the construction of the covering is non-essential to the present invention, and the covering may conveniently be of the character set forth in detail and claimed in my above identified copending application. Briefly, the covering consists of a sheet of a pliable and preferably water-proof material such as canvas or the like, and of the suitable dimensions and proportions to snugly cover and protect the vehicle for which the same is intended. This sheet preferably comprises a central strip 16 which is adapted to extend from the front bumper, over the top of the vehicle, and to the rear bumper of the same, as clearly illustrated in Figures 1 and 2 of the drawings, together with a pair of side panels 18, which are seamed or otherwise secured to the longitudinal side edges of the central strip 16, these side panels extending down the sides of the vehicle and being releasably fastened to the sides of the same as by a conventional form of spring fastener 19.

The side panels 18 are folded down and clamped to the sides of the vehicle as shown in Figures 1 and 2 when the cover is in use, or may be folded back upon the central strip to lie within the side edges of the same as is shown in Figure 3 when the cover is to be folded for storing as set forth hereinafter.

Suitable stiffening stays or the like indicated in dotted lines at 20 in Figure 1 are provided within the material of the central strip 16 and extending transverse thereof from one longitudinal edge of the same to the other in order to impart sufficient transverse rigidity to maintain the cover shape when the same is advanced from the storage reel or retracted and stored thereon by the power operating means as set forth hereinafter.

In addition to the foregoing, the cover is preferably provided with suitable electric heating means in the form of electric resistance conductors as set forth in my above identified prior application, the numeral 22 designating a current supplying cable for the same. Since the details of the electric heating means form no part of the present invention, an illustration of same is considered to be unnecessary.

In accordance with the present invention, however, means are provided which will provide ready access to the interior of the vehicle after the same has been enclosed in the protective covering 10. This access means may conveniently comprise an opening in one or both of the side panels 18, which opening is closed as by a slide fastener 24 of any conventional design. This slide fastener controlled opening is preferably positioned upon the side panel to register with the door of the vehicle to thereby provide a ready means for obtaining access to the interior of the vehicle without the necessity for removing the protective covering therefrom.

At what may be termed its rear end, the central strip 16 of the cover 10 is secured in a suitable manner to a reel or spindle 26 and is adapted to be wound thereon or unrolled therefrom as set forth hereinafter. The reel 26 is adapted at its opposite ends to be mounted in a pair of supporting brackets, each of which is indicated by the numeral 28. These brackets in turn are removably secured to the rear bumper 14, previously mentioned, in any desired manner as for example by fastening bolts 30 or the like. It will thus be seen that the brackets together with the reel journaled therebetween are removably secured to the rear bumper of the vehicle, and thus may be readily transferred from one vehicle to another as desired.

Extending upwardly and towards the rear portion of the vehicle from the brackets 28 is a pair of flanges 32, between which the reel extends and which may form a part of the journal bearing construction for the reel. These members 32 have journaled therebetween upwardly and forwardly with respect to the reel, a pair of parallel spaced guides 34 which may either consist of stationary rods or shafts, or if desired, may consist of rollers or the like. The cover 10, wound upon the reel 26, is passed between the rollers 34 to be supported and guided by the same as the cover is either unrolled from the reel or is wound thereon as set forth hereinafter.

At its front end, the cover 10, upon its central portion 16, is preferably provided with a stiffening or re-enforcing transverse strip 36, which may constitute a binder for the same, which is provided with a handle 38 to facilitate the manipulation of the cover. Extending through the terminal and re-enforcing binder portion 36 are a pair of locking apertures 40. Secured to the front bumper 12 adjacent the supporting brackets 41, or if desired, constituting a part of the supporting brackets, is a pair of cover-retaining clamps 42 which at the upper ends are provided with a vertical slot or bifuration 44 into which the transverse terminal strip 40 of the cover 10 may be received. A lock controlled bolt 46 of any desired character is adapted to extend across the furcations of the clamp 42 and be disposed through the locking apertures 40 of the cover for securely locking the front end of the cover to the front bumper of the vehicle. When the cover is disposed in this position, it will be understood the central strip of the same will be snugly drawn about the top, rear and front of the vehicle as suggested in the drawings.

Figure 5:
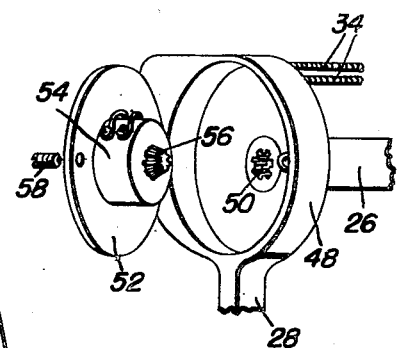
Figure 5 is a fragmentary detail view showing a portion of one of the reel mounting brackets and the manner in which the power operating means for the reel is mounted thereon and housed therein.

A power operated means is provided for winding up the cover about the reel when the same is to be removed from the vehicle; and for extending the cover from the reel to assist in positioning the cover upon the vehicle when the services of the cover are required. This power means, as shown in Figure 5, includes a drum-like housing 48 which forms a part of one of the brackets 28, the reel 26 extending into this housing and being provided with an internally splined socket 50.

The housing 48 is provided with an opening at one side thereof and a closure in the form of a disk or plate 52 is hinged to the housing 48 for opening and closing movement relative thereto. Mounted upon the interior surface of the cover 52 is an electric motor or the like 54 of any desired character, which is provided with a pinion 56 which is adapted to fit into the splined socket 50 of the reel 26 when the cover of the housing is in its closed position. A bolt or the like 58 serves to secure the housing in its closed position, at which time it will be apparent that the motor 54 is disposed within the housing 48 and has its driving gear 56 in operative engagement with the splined socket 50 at the end of the reel 26.

Any suitable electric circuit means is provided, not shown, whereby the electric motor may be energized from the electric storage battery of the vehicle. Preferably, the motor is of the reversible type whereby the same may be utilized for either rotating the reel to wind up the cover thereon or rotate the reel to unroll the cover therefrom.

When the device is in place, it is contemplated that the motor may be energized and thus cause the reel to unwind the cover, the latter passing between the guiding rollers 34 and because of the stiffness of the cover, the central strip with the side panels folded thereover will be passed through the rollers, up the rear of the vehicle, across the top of the same, into the position shown in Figure 3. At this point, the cover may be manually advanced to snugly enclose the vehicle, as shown in Figure 2. The side panels may then be folded down and secured by the spring fasteners 20 to the bottom of the sides of the vehicle. When it is desired to remove the cover, the side panels are released and then folded backwardly upon the central strip 16, as shown in Figure 3, and the front end 40 of the cover is then released from the clamps 42 of the front bumper of the vehicle. The electrical motor may then be energized to wind up the cover upon the reel until the same is again needed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A vehicle cover comprising a sheet of pliable material forming a protective covering for the top of a vehicle from its rear to its front bumper and for the sides thereof, a reel secured to the rear end of said sheet whereby the sheet may be wound thereon, means for mounting said reel upon the rear of a vehicle, an electric motor carried by said means and operable for selectively rotating said reel in opposite directions for winding and unwinding the sheet, said mounting means comprising brackets journaling said reel therein, one of said brackets having a housing therein, a closure hinged to said housing, said electric motor being mounted upon said closure for movement into said housing, a detachable driving connection between said motor and said reel.

2. A vehicle cover comprising a sheet of pliable material adapted to enclose the top, sides, front and back of a vehicle, a reel secured to the rear end of said sheet for winding the latter thereon, a pair of brackets journaling said reel therebetween and adapted for attachment to the rear bumper of a vehicle, a housing having a hinged closure forming part of one bracket, an electric motor mounted on said closure and movable into and out of said housing upon movement of said closure, said reel having a member extending into said housing, a driving member on said motor engageable with said reel member when said motor is moved into said housing.

3. The combination of claim 2 wherein said driving member and reel member comprise gears.

4. The combination of claim 2, including a pair of guides extending between said brackets, said sheet passing between said guides.

5. The combination of claim 4 wherein said guides comprise rollers journaled in said brackets.

6. In a vehicle cover construction including a reel and a cover wound thereon for covering the vehicle; the improvement comprising means for rotatively mounting the reel on the bumper of the vehicle, said means including a pair of spaced brackets for securement on the bumper, said reel having its ends journaled in said brackets, one of said brackets including an enlarged housing forming a part thereof, one end of said reel extending into said housing and having a socket therein, said housing having an opening therein, a closure hinged to the housing for closing said opening, an electric motor mounted on the inner surface of said closure having a driving member engageable in said socket for rotating the reel.

7. In a vehicle cover construction including a reel and a cover wound thereon for covering the vehicle; the improvement comprising means for rotatively mounting the reel on the bumper of the vehicle, said means including a pair of spaced brackets for securement on the bumper, said reel having its ends journaled in said brackets, one of said brackets including an enlarged housing forming a part thereof, one end of said reel extending into said housing and having an internally splined socket therein, said housing having an opening therein on the wall opposite the reel socket, a plate hingedly mounted on said housing closing said opening, an electric motor mounted on the inner surface of said plate and disposed within the housing, said motor having a driving pinion engaged in said socket, and means connected to said motor for energizing the same from the vehicle electrical supply.

References Cited in the file of this patent

UNITED STATES PATENTS

| Number | Name | Date |
|---|---|---|
| 1,715,286 | Handy | May 28, 1929 |
| 1,804,131 | Svihla | May 5, 1931 |
| 2,213,601 | White | Sept. 3, 1940 |
| 2,248,538 | Liebler | July 8, 1941 |

FOREIGN PATENTS

| Number | Country | Date |
|---|---|---|
| 110,940 | Great Britain | Nov. 8, 1917 |
| 473,572 | Great Britain | Oct. 15, 1937 |